(12) United States Patent
Bornholdt et al.

(10) Patent No.: US 11,780,301 B2
(45) Date of Patent: Oct. 10, 2023

(54) BLINDING ARRANGEMENT FOR THE SHIELDING OF A VEHICLE WINDSHIELD

(71) Applicant: REMIS Gesellschaft fuer Entwicklung und Vertrieb von technischen Elementen mbH, Cologne (DE)

(72) Inventors: Alexander Bornholdt, Siegburg (DE); Thomas Borowski, Erftstadt (DE)

(73) Assignee: REMIS GESELLSCHAFT FUER ENTWICKLUNG UND VERTRIEB VON TECHNISCHEN ELEMENTEN MBH, Cologne (DE)

( * ) Notice: Subject to any disclaimer, the term of this patent is extended or adjusted under 35 U.S.C. 154(b) by 240 days.

(21) Appl. No.: 17/023,399

(22) Filed: Dec. 21, 2020

(65) Prior Publication Data

US 2022/0194185 A1 Jun. 23, 2022

(51) Int. Cl.
*E06B 9/262* (2006.01)
*B60J 1/20* (2006.01)

(52) U.S. Cl.
CPC .......... *B60J 1/2077* (2013.01); *B60J 1/2038* (2013.01); *B60J 1/2044* (2013.01); *B60J 1/2047* (2013.01); *B60J 1/2052* (2013.01); *B60J 1/2069* (2013.01); *E06B 9/262* (2013.01); *E06B 2009/2625* (2013.01)

(58) Field of Classification Search
CPC ...... B60J 1/2077; B60J 1/2011; B60J 1/2055; B60J 1/2063; B60J 1/2066; B60J 1/2075; B60J 1/2069; B60J 1/2091; B60J 1/2038; B60J 1/2044; B60J 1/2047; B60J 1/2052; B60J 1/2016; E06B 9/262; E06B 2009/2625
See application file for complete search history.

(56) References Cited

U.S. PATENT DOCUMENTS

| | | | |
|---|---|---|---|
| 4,923,238 A | 5/1990 | Morgulis et al. | |
| 5,269,360 A | 12/1993 | Chen | |
| 8,061,757 B1* | 11/2011 | Moore | B60J 1/2019 296/97.4 |
| 10,989,238 B1* | 4/2021 | Chen | B60R 11/00 |

(Continued)

FOREIGN PATENT DOCUMENTS

| | | |
|---|---|---|
| AU | 2002301996 A1 | 10/2003 |
| DE | 203 06 085 U1 | 6/2003 |

(Continued)

*Primary Examiner* — Abe Massad
*Assistant Examiner* — Matthew R. Shepherd
(74) *Attorney, Agent, or Firm* — Norman B. Thot

(57) ABSTRACT

A blinding arrangement for shielding a vehicle front windshield. The blinding arrangement includes at least one blinding system which includes a cassette, a spannable blinding body which can be moved out of and into the cassette, a horizontal upper guide rail for guiding the spannable blinding body in a horizontal direction, and a cassette locking arrangement. The horizontal upper guide rail is fixedly mounted above the vehicle front windscreen. The cassette pivots within a cassette pivot plane between a horizontal non-use position in which the cassette is arranged parallel to the horizontal upper guide rail and a lowered use position in which the cassette is arranged perpendicular to the horizontal upper guide rail. The cassette locking arrangement locks the cassette in the horizontal non-use position.

2 Claims, 4 Drawing Sheets

(56) References Cited

U.S. PATENT DOCUMENTS

| | | | |
|---|---|---|---|
| 2002/0108726 A1* | 8/2002 | Huang | B60J 1/2091 |
| | | | 160/370.23 |
| 2003/0196769 A1* | 10/2003 | Huang | B60J 1/2091 |
| | | | 160/370.23 |
| 2005/0051285 A1* | 3/2005 | Yano | B60J 1/2027 |
| | | | 160/370.22 |
| 2005/0061454 A1* | 3/2005 | Chen | B60J 1/2025 |
| | | | 160/370.22 |
| 2013/0255892 A1* | 10/2013 | Ojima | B60J 1/2083 |
| | | | 160/266 |
| 2017/0114591 A1 | 4/2017 | Chen | |
| 2018/0258692 A1* | 9/2018 | Conway | E06B 7/18 |
| 2019/0001794 A1* | 1/2019 | Gonzalez | B60J 1/2038 |
| 2020/0108698 A1* | 4/2020 | Sakurai | B60R 11/0235 |

FOREIGN PATENT DOCUMENTS

| | | | | |
|---|---|---|---|---|
| DE | 102006026757 A1 * | 12/2007 | | B60J 1/2088 |
| FR | 2749878 A1 * | 12/1997 | | B60J 1/2044 |
| FR | 2 765 157 A1 | 12/1998 | | |
| KR | 20090080854 A * | 7/2009 | | B60J 1/2091 |

* cited by examiner

BLINDING ARRANGEMENT FOR THE SHIELDING OF A VEHICLE WINDSHIELD

FIELD

The present invention relates to a blinding arrangement for the shielding of a vehicle windshield.

BACKGROUND

Such blinding arrangements are used in motor vehicles, in particular in so-called mobile homes, in order to shield the vehicle interior against unwanted outside views and also to allow the interior to be darkened.

Such blinding arrangements typically have at least one blinding system with a blinding body that can be clamped in front of the windshield to shield it, if necessary.

A blinding arrangement with two blinding systems has, for example, been described in U.S. Pat. No. 5,269,360 A and US 2017/0114591 A1, each of which has a horizontally clampable blinding body. The blinding bodies are arranged on the two opposite transverse sides of the windshield in the transverse direction of the vehicle, with the blinding bodies each being attached to the so-called A-pillar of the vehicle. The two blinding bodies are each guided in the horizontal direction by a fixed upper guide cord and a fixed lower guide cord, and can be stretched towards the center of the windshield so that the windshield can be shielded by the two blinding bodies in a stretched blinding position. The blinding bodies can each be locked in a holder mounted at the A-pillar in a folded insertion position.

Airbag systems are, however, often provided in modern motor vehicles in the region of the A-pillar, which airbag systems can be obstructed by the blinding arrangement. The fixed guide cords of the arrangement also affect the visual impression of the vehicle interior.

DE 203 06 085 U1 also describes a blinding arrangement with a cassette and with a clampable blinding body that can be moved out of and into the cassette. The cassette is permanently mounted at the dashboard of the car, i.e., at the lower end of the windshield, and has a pivoting guide rail at each of the two transverse ends. When not in use, the folded blinding body is completely accommodated in the cassette and the pivoting guide rails are each in a folded horizontal position. In the position of use, the guide rails are in a folded-out position perpendicular to the cassette so that the blinding body can be moved up and down along the guide rails in front of the front panel in order to shield the windshield in a clamped shielding position if required.

In modern cars, however, storage compartments are often arranged in the area of the dashboard, the function of which can be affected by the described blinding arrangement. Modern motor vehicles may also have airbag systems in the dashboard area, which can also be affected by the described panel arrangement. The cassette arranged at the dashboard additionally affects the driver's view of the road when driving.

SUMMARY

An aspect of the present invention is to provide a blinding arrangement that provides a reliable blinding of the vehicle front windshield when the vehicle is stationary and which neither hinders the safety devices of the vehicle nor affects the driver's field of vision when driving.

In an embodiment, the present invention provides a blinding arrangement for shielding a vehicle front windshield. The blinding arrangement includes at least one blinding system which comprises a cassette, a spannable blinding body which can be moved out of and into the cassette, a horizontal upper guide rail for guiding the spannable blinding body in a horizontal direction, and a cassette locking arrangement. The horizontal upper guide rail is configured to be fixedly mounted above the vehicle front windshield. The cassette is configured to pivot within a cassette pivot plane between a horizontal non-use position in which the cassette is arranged parallel to the horizontal upper guide rail and a lowered use position in which the cassette is arranged perpendicular to the horizontal upper guide rail. The cassette locking arrangement is configured to lock the cassette in the horizontal non-use position.

BRIEF DESCRIPTION OF THE DRAWINGS

The present invention is described in greater detail below on the basis of embodiments and of the drawings in which.

DETAILED DESCRIPTION

Figure 1:
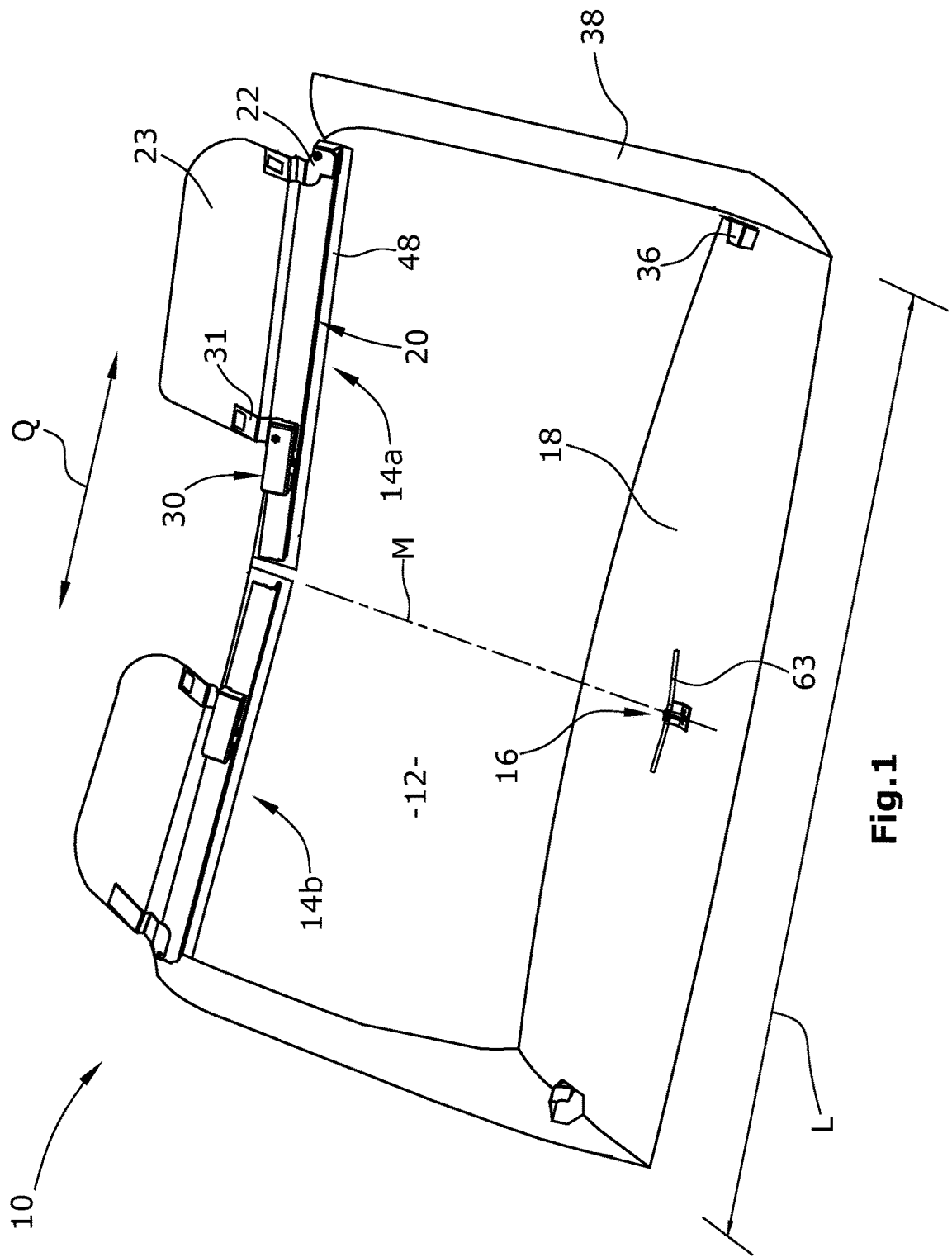
FIG. 1 shows a blinding arrangement of the present invention mounted in a motor vehicle with two blinding systems in a position of non-use.

The blinding arrangement according to the present invention for shielding of a vehicle windshield comprises at least one blinding system with a cassette and with a clampable blinding body which can be moved out of the cassette and into the cassette. The blinding body is arranged in a space-saving and in an unobtrusive manner in the cassette in a slide-in position. The blinding body can, for example, be arranged completely inside the cassette in the slide-in position. If necessary, the blind body can be moved out of the cassette into a blinding position in which the blinding body is clamped in front of the front panel in order to blind the front panel. A handle bar is typically attached to the blinding body via which the blinding body can be reliably moved out of the cassette and into the cassette.

The blinding system further comprises a horizontal upper guide rail for guiding the blinding body in a horizontal direction. In the present context, all directions are related to the motor vehicle in which the blinding arrangement according to the present invention can be mounted. A horizontal direction is therefore any direction parallel to the ground on which the vehicle is standing. The upper guide rail can, for example, extend substantially parallel to the windshield and substantially in a transverse direction of the vehicle. The upper guide rail is fixed, i.e., immovable, above the windshield and can be permanently installed in the vehicle. The term "above the windshield" means any installation location in the vehicle interior that is higher than or equal to the upper edge of the windshield visible from the vehicle interior. The upper guide rail may in particular be mounted on a motor vehicle roof interior or on a roof area of the motor vehicle body. It is also possible that the upper guide rail can be mounted directly on the upper edge of the windshield. This means that the upper guide rail, which is permanently mounted in the vehicle during operation, is, according to present invention, located outside the driver's field of vision. The upper guide rail can, for example, be relatively stiff and extend substantially parallel to the windshield to provide a stable and reliable guide for the blinding body along the windshield. The upper guide rail can, for example, be made of plastic or can be made of any other relatively stiff and lightweight material.

In accordance with the present invention, the cassette is pivotable within a cassette pivot plane which can, for example, extend substantially parallel to the vehicle front windshield between a horizontal non-use position, in which the cassette is arranged parallel to the upper guide rail, and a lowered use position, in which the cassette is arranged perpendicular to the upper guide rail. In the non-use position, the cassette with the blinding body accommodated therein is thus arranged above the windshield or at least at an upper edge area of the windshield. If required, the cassette can be pivoted from the horizontal non-use position into the pivoted-down use position, in which the blinding body can be moved out of the cassette along the upper guide rail and clamped in front of the front panel. The cassette is typically arranged so that, in the use position, it is positioned on the A-pillar of the vehicle and extends substantially parallel to the A-pillar. The cassette can, for example, be attached directly to a roof area of the vehicle body via a cassette retaining element, the cassette retaining element having a pivot joint by which the cassette is pivotally connected to the cassette retaining element. The cassette holding element can, for example, be made of metal.

Since the cassette would pivot automatically from the non-use position to the use position without any additional precautions due to gravity, a cassette locking device is provided in accordance with the present invention via which the cassette can be reliably locked in the non-use position. An unintentional swinging down of the cassette can thereby be reliably avoided, especially when the vehicle is being operated.

In the blinding arrangement according to the present invention, the cassette with the blinding body accommodated therein is arranged outside the driver's field of vision in the non-use position in a space-saving manner. The blinding arrangement in accordance with the present invention also does not have any components within the effective range of airbag systems or other automotive safety devices in the non-use position. When driving, neither safety devices of the vehicle are obstructed by the arrangement according to the present invention nor is the field of vision of the driver affected by the blinding arrangement according to the present invention.

The blinding arrangement according to the present invention in the position of use allows the blinding body to be reliably clamped in place, thus enabling, in a stationary vehicle, a reliable blinding of the vehicle front windshield.

Two blinding systems can, for example, be provided which are mirror-symmetrical to each other and which can be mounted mirror-symmetrically in relation to a vertical vehicle windshield centerline. The two blinding systems are typically arranged so that the cassettes of the two blinding systems are arranged on the two A-pillars of the vehicle in the lowered position of use. The cassettes and the upper guide rails of the two blinding systems are designed so that the blinding bodies of the two blinding systems can be clamped towards the center of the windshield in order to substantially completely shield the windshield. The handles of the two clamped blinding bodies can, for example, be attached to each other in the shielding position as required, for example, via a magnetic connection to lock the two blinding bodies in the shielding position. Compared to a version with a single blinding system, each blinding body must only cover a significantly smaller front panel surface area so that the two blinding bodies can be significantly smaller. The cassettes of the two blinding systems can thereby also be made significantly more compact and lighter, which means that the cassettes can be arranged unobtrusively in the roof area of the vehicle interior when not in use and can also be locked in place particularly reliably.

In an embodiment of the present invention, the blinding body can, for example, be a foldable pleat. The pleated blind, also known as a folding blind, is of simple construction, can be stored compactly in the cassette, and can be reliably stretched in front of the front panel. The respective folding areas of the pleat blind can, for example, each have guide openings at an upper edge area through which the upper guide rail extends and over which the pleated blind can be reliably moved along the guide rail. The pleat blind provides an inexpensive and reliable blinding body.

An upper end of the cassette (with respect to the position of use) can, for example, be connected to one end of the upper guide rail via an upper guide rail hinge. The cassette is permanently connected to the upper guide rail via the upper guide rail hinge irrespective of the cassette position, whereby the upper guide rail hinge forms a guide for the blinding body in the transition area between the cassette and the upper guide rail, at least in the position of use. This provides that the blinding body is always reliably guided by the upper guide rail when it is moved out of the cassette without the need for a manual alignment of the blinding body relative to the upper guide rail.

A lower guide rail can, for example, be provided for guiding the blinding body in the horizontal direction, wherein one end of the lower guide rail is connected via a lower guide rail hinge to a lower end of the cassette opposite the upper end of the cassette, and wherein the lower guide rail is arranged parallel to the cassette in the non-use position and perpendicular to the cassette in the use position.

The blinding system according to the present invention with the two guide rail joints can therefore be folded out/folded-in in two stages. When not in use, the lower guide rail is folded up against the cassette via the lower guide rail joint or folded into the cassette and thus accommodated in the cassette. The cassette including the lower guide rail is also hinged to the upper guide rail via the upper guide rail hinge. The lower guide rail is thus accommodated in a space-saving manner in the non-use position and can in particular be accommodated unobtrusively in/on the cassette. In the position of use, the lower guide rail is folded out and arranged rectangular to the cassette. In the position of use, the lower guide rail is therefore arranged parallel to the upper guide rail at the opposite end of the cassette and creates a guide for the lower end of the blinding body when moving the blinding body out of or into the cassette.

This allows the blinding body to be unfolded very conveniently. The lower guide rail furthermore prevents the clamped blinding body from "slacking" if the blinding body is not exactly vertical and also prevents the unfolded blinding body from swinging. This creates a particularly reliable blinding arrangement that provides for a comfortable and reliable blinding of the front panel in the position of use and which can be accommodated compactly and unobtrusively in the position of non-use.

In an embodiment of the present invention, the lower guide rail can, for example, be reliably lockable to the cassette in the non-use position in order to prevent, especially during vehicle operation, an unintentional folding out of the lower guide rail.

A guide rail locking device can, for example, be provided, which guide rail locking device can be positioned and fixedly mounted at a lower end area of the vehicle front windshield and by which the lower guide rail can be locked in the position of use. The guide rail locking device is typically permanently fixed to the dashboard of the vehicle in the mounted state and, in the position of use, provides a reliable and defined alignment of the lower guide rail and thus of the blinding body with respect to the vehicle and thus in particular with respect to the windshield. This enables a particularly reliable shielding of the windshield. In the position of use, a free end of the lower guide rail facing away from the cassette can, for example, be attached to the guide rail locking device, thereby locking the lower guide rail easily and reliably.

In the embodiment of the blinding arrangement with two blinding systems, the guide rail locking device can, for example, lock the lower guide rail of both blinding systems. Only one single guide rail locking device must consequently be provided for locking the two lower guide rails. The guide rail locking device can, for example, be designed so that the blinding bodies of the two blinding systems are in direct horizontal contact with each other in their fully opened blinding position, so that the front windshield can be substantially completely shielded by the two blinding bodies.

Since the lower guide rail is folded into/onto the cassette in the non-use position, the length of the lower guide rail is limited to the height of the cassette. In an embodiment of the present invention, in the position of use, the guide rail locking device together with the lower guide rail of both blinding systems can, for example define a lower blinding body guide for guiding the blinding body in the horizontal direction, whereby in the position of use, the horizontal guiding length of the lower blinding body guide is more than twice the height of the cassette arranged perpendicular to the blinding body guide. A horizontal guide element can, for example, be provided for this purpose at the guide rail locking device which, in the position of use, connects horizontally the lower guide rails of the two blinding systems and which defines the lower blinding body guide together with the rails. The lower guide rail can, for example, also be telescopic. This design allows for the complete shielding of a front panel whose width is more than twice its height.

In an embodiment of the present invention, the upper guide rail hinge and/or the lower guide rail joint can, for example, be defined by an elastically flexible spring element. The spring element can, for example, be a helical spring. The spring element can alternatively also be a solid body of a relatively elastic material, for example, of ethylene-propylene-diene rubber (EPDM), of a thermoplastic elastomer (TPE), or of another elastic plastic. The spring element creates a reliable and cost-effective guide rail joint with good guiding characteristics.

For safety reasons, it must be ensured that the cassette is reliably locked in the folded-up non-use position before vehicle operation. The cassette locking device can, for example, be equipped with a locking sensor which allows an electronic detection of the locking status of the cassette. The locking sensor can, for example, be defined by a low-cost magnetic switch. The locking sensor provides a locking signal which can be read out, for example, by a car on-board electronics. This can prevent the engine from starting, for example, if the cassette is not locked. The locking signal can also be used in a simple way to provide a warning signal.

In an embodiment of the present invention, the cassette locking arrangement can, for example, have a locking projection located at a rear side of the cassette orientated to the vehicle front windshield, and the cassette locking arrangement can, for example, have a locking receptacle which is mountable above the vehicle front windshield and into which the locking projection engages when the cassette is in the non-use position. The locking protrusion can be reliably locked in the locking receptacle, for example, by a pretensioned pusher. This provides a cost-effective and reliable cassette locking arrangement that is unobtrusively located at the back of the cassette. The locking device can, for example, be attached directly to the body to create a particularly stable and reliable cassette locking arrangement.

The cassette locking device can, for example, have a manually operated release element which releases the locking of the cassette in the non-use position. The unlocking element can, for example, be designed as a simple button or lever. The unlocking element is located at a side of the cassette's pivoting plane that faces the front windshield of the vehicle when mounted so that it is positioned closer to the front windshield than the cassette, especially in the non-use position. The unlocking element can, for example, be located at a lower side or at a rear side of the locking device shielding the front windshield. The unlocking element in the non-use position is in any case positioned behind the pivot plane of the cassette in relation to the driver's position in which the cassette moves out of the non-use position when it is pivoted down. This ensures that when the unlocking element is operated manually by the driver, that the palm of the driver's hand is typically below the cassette and can therefore safely hold the cassette as it pivots down.

In an embodiment of the present invention, a cassette holder can, for example, be provided which is permanently mountable at a vehicle dashboard and/or a vehicle A-pillar and which only temporarily accommodates the lower end of the cassette in the position of use. Because of the cassette holder, the cassette and thus also the blinding body is reliably positioned in the position of use. The cassette holder prevents an uncontrolled oscillation of the cassette in the working position.

A cassette cover can, for example, be provided which can be mounted above the vehicle front windshield and which, in the non-use position, at least partially covers the cassette at a front side facing away from the vehicle front windshield. The cassette cover can, for example, be designed so that the cassette is substantially completely covered by the cassette cover in the non-use position. The cassette cover can, for example, also have a flap device that covers the underside of the cassette when not in use. The shape and color of the cassette cover is typically adapted to the interior of the corresponding vehicle. The cassette can thereby be accommodated very unobtrusively in the non-use position so that the visual impression of the interior is only minimally affected by the invention's blinding arrangement.

For safety reasons, the blinding assembly is typically mounted so that in the non-use position, the cassette is positioned at a distance from the vehicle A-pillar where airbag systems are often located. In an embodiment of the present invention, a cassette pivot joint can, for example, be arranged eccentrically on an inner cassette half facing away from a vehicle A-pillar in the use position when mounted so that the cassette moves towards the vehicle A-pillar when swung down to the use position. The cassette in the pivoted-down position of use can, for example, lie at least partially on the vehicle A-pillar in order to enable a substantially complete shielding of the windshield.

To facilitate the handling of the blinding assembly, the blinding system is generally provided with a substantially plate-shaped handle bar located at one movable end of the blinding body which allows the blinding body to be moved out of and into the cassette. In this context, "plate-shaped" means that the extension of the handle bar in a first horizontal transverse direction is significantly larger than the extension of the handle bar in a second horizontal transverse direction perpendicular to the first transverse direction. A front and a back side of the handle bar consequently have a significantly larger area than the two lateral sides of the handle bar.

According to the present invention, the handle bar can be rotated between a transverse position and a parallel position. In the transverse position, the handle bar is aligned transversely to the direction of movement of the blinding body, i.e., the handle bar is arranged so that the front/rear side of the handle bar, which is larger in area, is perpendicular to the direction of movement of the blinding body. In the parallel position, the handle bar is aligned parallel to the direction of movement of the blinding body, i.e., the handle bar is arranged so that the front/rear side of the handle bar with the larger surface area is parallel to the direction of movement of the blinding body. The rotatable handle bar can be accommodated relatively compactly in the cassette in its transverse position. In the parallel position, the rotatable handle bar can be moved easily through relatively narrow gaps, such as between the windshield and the interior mirror. The rotatable handle bar also allows the handle bar to be moved particularly comfortably since the rotation allows the handle bar to be adapted to different hand positions during movement.

The rotatable handle bar can be used for all blinding systems with an extendable blinding body irrespective of the blinding arrangement according to the present invention.

In an embodiment of the present invention, a rotation joint can, for example, be formed at at least one longitudinal end of the handle bar which is guided at the upper guide rail or at the lower guide rail. The rotation hinge comprises a first transverse bore extending from the front side of the handle bar, which is turned away from the cassette in the handle bar transverse position, to the opposite rear side of the handle bar, and comprises a second transverse bore extending perpendicular to the first transverse bore from the first lateral handle bar side, which is turned away from the cassette in the handle bar parallel position, to the opposite second lateral handle bar side. The two transverse bores cross each other, typically in the middle of the handle bar, and are connected to each other via two diagonally opposite corner recesses so that the guide rail can be rotated between the first transverse bore and the second transverse bore. In the handle bar transverse position, the guide rail extends substantially through the first transverse bore and, in the handle bar parallel position, the guide rail extends substantially through the second transverse bore. The diagonally opposite corner recesses allow the handle bar to be rotated at the guide rail without the handle bar losing its guidance through the guide rail. The rotation joint provides a reliable and captive guidance of the handle bar at the guide rail, whereby the handle bar can be rotated freely between the transverse position and the parallel position.

In the fully inserted position in which the blinding body is completely folded inside the cassette, the handle bar can, for example, take the handle bar transverse position and substantially completely cover the front side of the blinding body pointing in the direction of pull-out. The relatively damageable blinding body is thus reliably protected by the handle bar in the slide-in position, both against mechanical impact and dirt. The blinding body is also "hidden" by the handle bar so that the blinding body does not affect the visual impression of the interior when in the slide-in position.

In an embodiment of the present invention, the handle bar can, for example, take the handle bar parallel position in the extended blinding position in which the blinding body is spanned in front of the front windshield. A magnetic strip is furthermore arranged on the first lateral side of the handle bar which in the position of use is oriented away from the cassette and transversely to the direction of movement of the blinding body. The magnetic strip provides a reliable magnetic locking of the handle bar to a corresponding ferromagnetic body or to a corresponding second magnetic strip, and thus a reliable locking of the blinding body in the shielding position. The handle bar can, for example, be arranged in the handle bar transverse position in the fully inserted position so that the first lateral handle bar side with the magnetic strip is located inside the cassette and is therefore not visible from the outside.

An embodiment of a blinding arrangement of the present invention for shielding of a vehicle windshield is described below under reference to the drawings.

FIG. 1 shows a blinding arrangement 10 for blinding a vehicle front windshield 12 in the mounted state. In the shown embodiment, the blinding arrangement 10 comprises two blinding systems 14a, 14b as well as a guide rail locking device 16. The two blinding systems 14a, 14b are mirror-symmetrical to each other and are arranged mirror-symmetrically with respect to a vertical vehicle windshield centerline M. The guide rail locking device 16 is positioned centrally in relation to a transverse vehicle direction Q, i.e., at the transverse position of the vehicle front windshield centerline M, on an underside of the vehicle front windshield 12 and is mounted in a fixed position at a vehicle dashboard 18.

Figure 2:
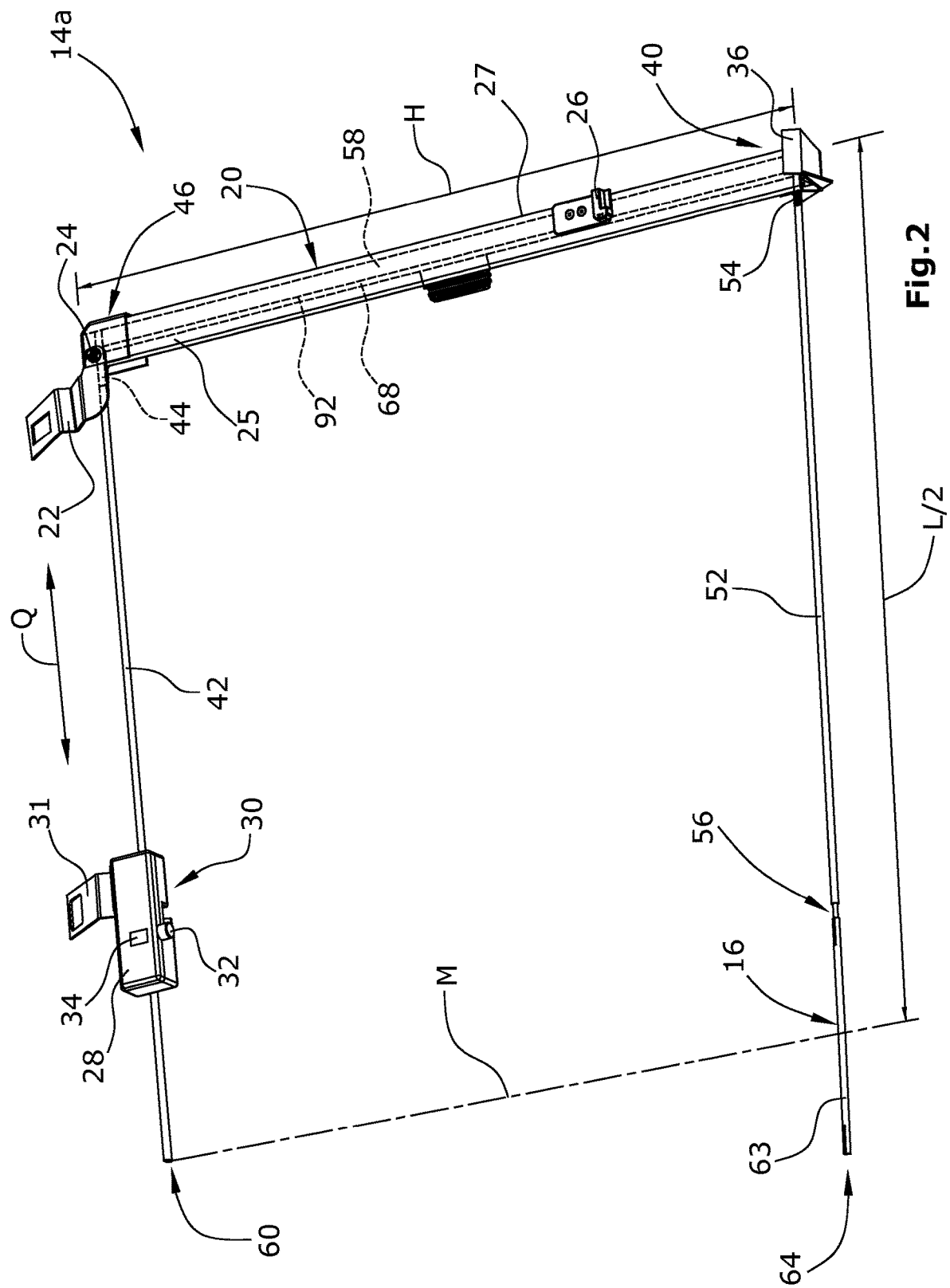
FIG. 2 shows a first blinding system of the blinding arrangement of FIG. 1 in a position of use, with a cassette of the blinding system swung down and a lower guide rail of the blinding system folded out.
Figure 3:
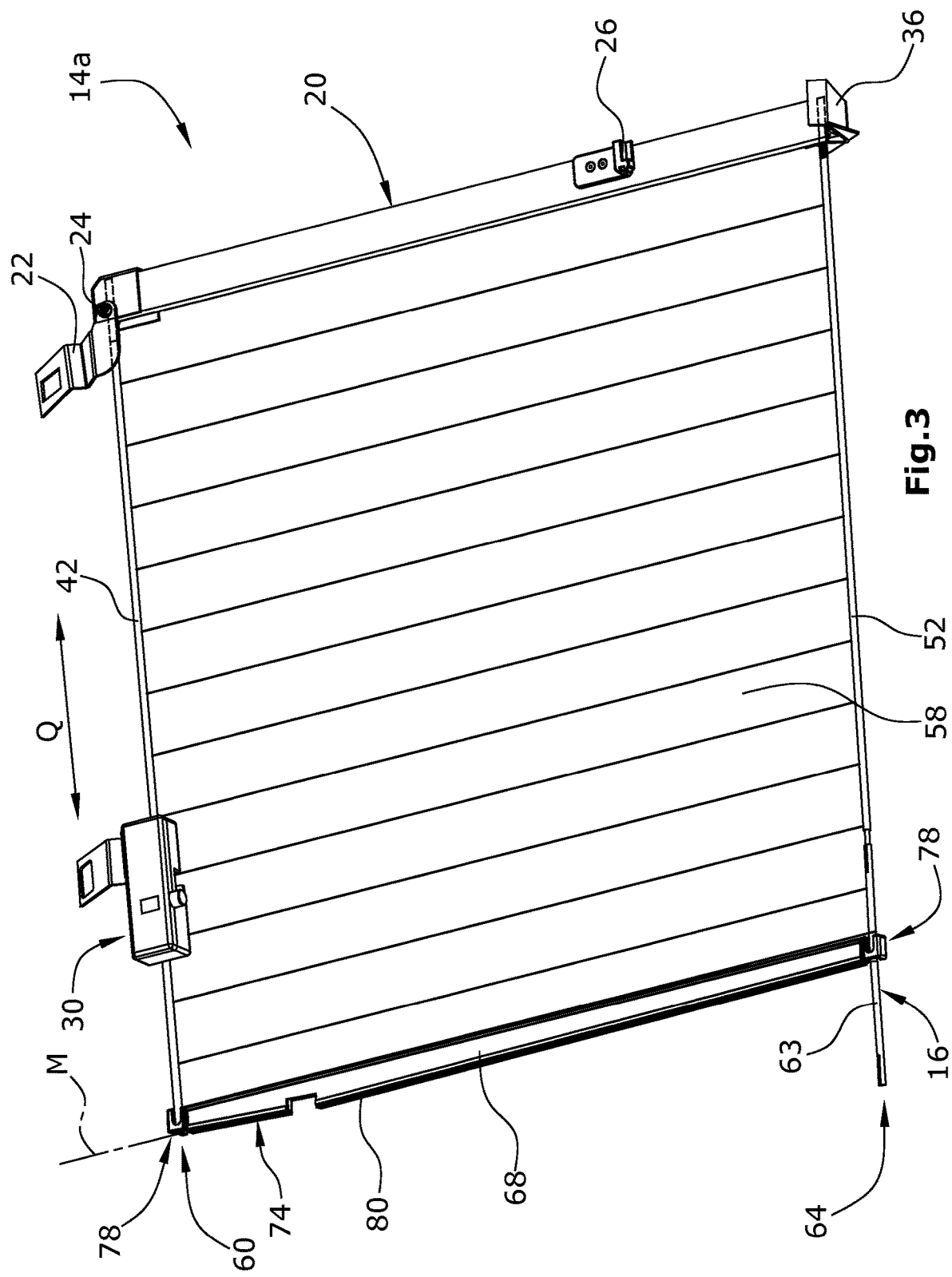
FIG. 3 shows the blinding system of FIG. 2 in a blinding position, with a blinding body of the blinding system spanned in front of the windshield.

The structure of the two blinding systems 14a,14b is described below in general terms for both blinding systems 14a,14b with the reference numeral 14 without the use of "a" and "b", and is illustrated in FIGS. 2 and 3 using the first blinding system 14a as an example. The components of the two blinding systems are mirror-symmetrical to each other in relation to the vehicle front windshield centerline M of the vehicle windshield.

Each blinding system 14 comprises a cassette 20 which is attached to the vehicle body via a cassette holding element 22, for example, to a sun visor 23. The cassette 20 is connected to the cassette holding element 22 via a cassette pivot joint 24 so that the cassette 20 can be pivoted within a cassette pivot plane between a horizontal non-use position, in which the cassette 20 extends substantially in the transverse vehicle direction Q, as shown in FIG. 1, and a lowered use position, in which the cassette 20 extends substantially perpendicular to the vehicle transverse direction Q, as shown in FIGS. 2 and 3. The cassette pivot joint 24 is eccentrically arranged on an inner cassette half 25 which is turned away from a vehicle A-pillar 38 in the use position so that the cassette 20 is positioned at a distance from the vehicle A-pillar 38 in the non-use position and rests against the vehicle A-pillar 38 along substantially the entire cassette length in the use position.

On a rear side 27 of the cassette 20 facing the vehicle front windshield 12, a locking projection 26 is arranged which, together with a locking receptacle 28 mounted above the vehicle front windshield 12, defines a cassette locking arrangement 30 by which the cassette 20 can be reliably locked in the non-use position. The locking projection 26 engages the locking receptacle 28 in the non-use position, whereby the locking projection 26 is reliably locked in the locking receptacle 28 by a locking mechanism (which is not shown in the drawings). In the shown embodiment, the locking receptacle 28 is attached to the vehicle body via a locking receiver holding element 31, for example, to a sun visor 23. A manually operated unlocking element 32 is arranged at the underside of the locking receptable 28 facing the vehicle dashboard 18. In the shown embodiment, the unlocking element 32 is designed as an upwardly actuated pushbutton switch which, as shown in FIG. 1, is located in the non-use position behind the pivoting plane of the cassette 20, i.e., closer to the vehicle front windshield 12 than the cassette 20.

In the shown embodiment, the cassette locking arrangement 30 also has a locking sensor 34 via which the locking status of the locking mechanism and thus the locking status of the cassette 20 can be electronically detected. In this embodiment, the locking sensor 34 is designed as a magnetic switch which is triggered by the magnetic field of a sensor magnet in the locked state, i.e., when the cassette 20 is locked. The sensor magnet is typically located at a movable latch of the locking mechanism or at the locking projection 26.

Each blinding system 14 also includes a cassette housing 36 which is mounted in close proximity to a vehicle A-pillar 38 at the vehicle dashboard 18, and which holds a lower end 40 of the cassette 20 in the position of use, as shown in FIGS. 2 and 3.

Each blinding system 14 further comprises a horizontal upper guide rail 42 which is fixedly mounted above the vehicle front windshield 12. The upper guide rail 42 can, for example, be attached to the cassette holder element 22 and/or the lock retainer holding element 31. The upper guide rail 42 is connected to an upper end 46 of the cassette 20 via an upper guide rail hinge 44, which in the shown embodiment is designed as a helical coil spring joint. The upper guide rail 42 extends horizontally, substantially parallel to the vehicle front windshield 12, in the transverse vehicle direction Q of the vehicle from the cassette 20 to the vehicle front windshield centerline M or at least to the close vicinity of the vehicle front windshield centerline M. It is also, however, possible that the two blinding systems have a common upper guide rail which extends from the cassette of the first blinding system to the cassette of the second blinding system and is connected to the respective cassette at both transverse ends via an upper guide rail hinge. The upper guide rail 42 is designed as a metal pipe, for example, as a steel pipe in the shown embodiment.

Each blinding system 14 also includes a cassette cover 48 mounted above the vehicle front windshield 12, for example, the cassette cover 48 can be attached to the cassette holder element 22 and/or the lock retainer holding element 31. The cassette cover 48 covers the upper guide rail 42 in relation to a longitudinal direction of the vehicle and, in the position of non-use, also covers the cassette 20 at a front side facing away from the vehicle front windshield 12. In the shown embodiment, a lower edge of the cassette cover 48, as shown in FIG. 1, protrudes downwards beyond the underside of the cassette 20 in the non-use position so that the upper guide rail 42 and, in the non-use position, also the cassette 20 are, relative to a driver position, substantially completely covered by the cassette cover 48.

Each blinding system 14 further comprises a lower guide rail 52, which is connected to the lower end 40 of the cassette 20 via a lower guide rail joint 54, which in the shown embodiment is designed as a helical spring joint. In this example, the lower guide rail 52 is designed as a metal tube, for example, a steel tube. Via the lower guide rail joint 54, the lower guide rail 52 can be pivoted relative to the cassette 20 between a non-use position, in which the lower guide rail 52 is arranged parallel to the cassette 20, and a use position, in which the lower guide rail 52 is arranged substantially perpendicular to the cassette 20. In the shown embodiment, the lower guide rail 52 is hinged to the cassette 20 in the non-use position and reliably locked to the cassette 20. The cassette 20 may have a guide rail receptacle in which the lower guide rail 52 is held in the non-use position by a snap connection. In the folded-out position of use, the lower guide rail 52 is arranged substantially parallel to the upper guide rail 42 and is reliably fixed to the guide rail locking device 16 with a free end 56 facing away from the cassette 20. In the shown embodiment, the guide rail locking device 16 is designed so that the lower guide rail 52 of both blinding systems 14a, 14b can be reliably fastened to the guide rail locking device 16 in the position of use.

Each blinding system 14 also includes a spannable blinding body 58, which in the shown embodiment is designed as a foldable pleated blind. In the position of use of the blinding arrangement 10, i.e., as shown in FIGS. 2 and 3 with the cassette 20 folded down and the lower guide rail 52 unfolded, the blinding body 58 can be moved in the horizontal direction, i.e., in the transverse vehicle direction Q of the vehicle, out of the cassette 20 or into the cassette 20. The blinding body 58 is completely folded together in a push-in position and arranged inside the cassette 20. The blinding body 58 is pulled out of the cassette 20 in a shielding position and is clamped in front of the vehicle front windshield 12. The upper guide rails 42 of the two blinding systems 14a, 14b define an upper blinding body guide 60 for guiding a blinding body upper side of the two blinding bodies 58 in the horizontal direction, and the two lower guide rails 52 together with a guide element 63 of the guide rail locking device 16 define a lower blinding body guide 64 for guiding a blinding body underside of the two blinding bodies 58 in the horizontal direction. The upper blinding body guide 60 and the lower blinding body guide 64 each extend substantially along the entire width of the vehicle front windshield 12 in the transverse vehicle direction Q and each have a horizontal guide length L that is more than twice the height H of the cassette 20 arranged perpendicular to the two blinding body guides 60, 64. In the shown embodiment, the blinding body 58 has a large number of guide holes at its upper side and at its lower side, through which the upper guide rail 42 and the lower guide rail 52 extend, respectively.

A substantially plate-shaped handle bar 68 is attached to an inner movable end of the blinding body 58 which allows the blinding body 58 to be easily moved out of the cassette 20 and into the cassette 20. "Plate-shaped" in this context means that a front side 70 and a rear side 72 of the handle bar 68 have a significantly larger surface area than lateral sides 74, 76 of the handle bar 68.

Figure 4:
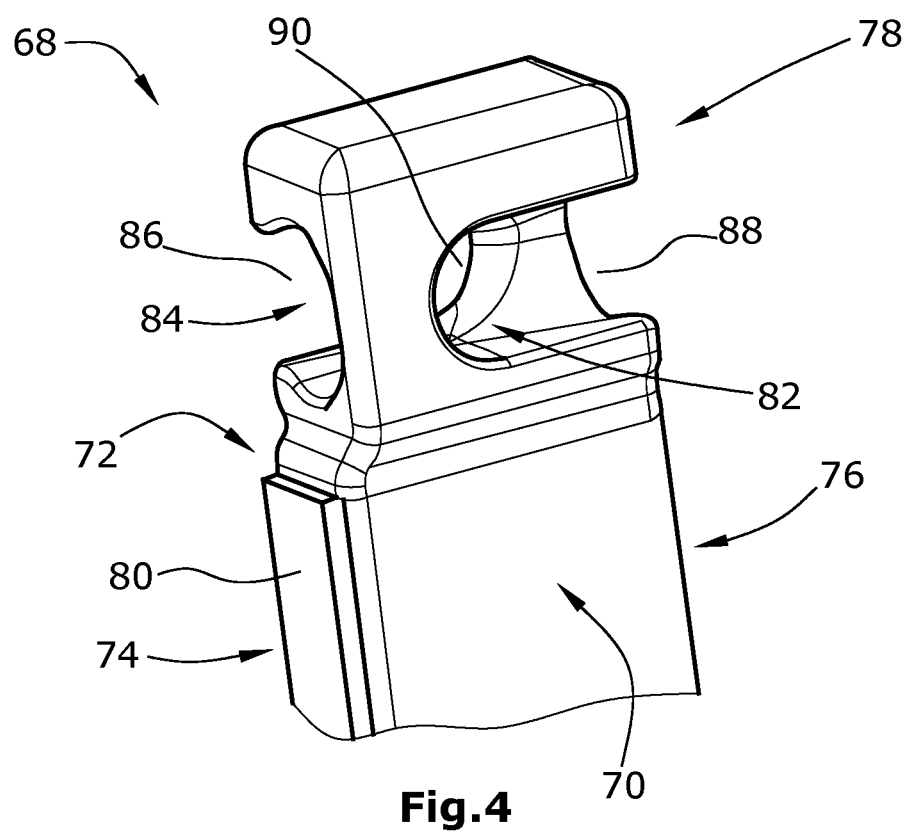
FIG. 4 shows a rotation joint of a handle bar of the blinding arrangement shown in FIG. 1.

In the shown embodiment, the handle bar 68 has a rotating joint 78 at both longitudinal ends, whereby the rotation joint 78 at the upper longitudinal end of the handle bar 68 and the rotation joint 78 at the lower longitudinal end of the handle bar 68 are substantially mirror-symmetrical to each other. A rotation joint 78 according to the present invention is shown as an example in FIG. 4.

The handle bar 68 is guided at the two guide rails 42, 52 via the two rotation joints 78, whereby the handle bar 68 can be rotated between a handle bar transverse position and a handle bar parallel position relative to the two guide rails 42, 52 via the two rotation joints 78. In the handle bar transverse position, the front side 70 and the rear side 72 of the handle bar 68 are aligned perpendicular to the two guide rails 42, 52 so that the handle bar 68 is arranged transverse to the direction of movement. In the handle bar parallel position, the front side 70 and the rear side 72 of the handle bar 68 are aligned parallel to the two guide rails 42, 52 so that the handle bar 68 is arranged parallel to the direction of movement. In the handle bar transverse position, the handle bar 68 thus has a larger cross-sectional area perpendicular to the direction of movement than in the handle bar parallel position. In the fully inserted position, the handle bar 68 takes the handle bar transverse position, and in the extended blinding position, the handle bar 68 takes the handle bar parallel position. A magnetic strip 80 is attached to the first lateral side 74 of the handle bar 68, which is facing away from the cassette 20 in the parallel position, in this embodiment.

The rotation joint 78 comprises a first transverse bore 82, which extends from the front side 70 of the handle bars 68, which in the handle bar transverse position faces away from the cassette 20, to the opposite rear side 72 of the handle bar 68, and comprises a second transverse bore 84, which extends from the first lateral side 74 of the handle bar 68, which in the handle bar parallel position faces away from the cassette 20, to the opposite second lateral side 76 of the handle bar 68. The two traverse bores 82, 84 intersect in the center of the rotation joint 78. The rotation joint 78 according to the present invention has two diagonally opposite corner recesses 86, 88 through which the two transverse bores 82, 84 are connected to each other. The first corner recess 86 extends from the first handle side 74 to the rear handle side 72, and the second corner recess 88 extends from the second lateral side 76 of the handle bar 68 to the first lateral side 70 of the handle bar 68. The two transverse bores 82, 84 and the two corner recesses 86, 88 define a rotation chamber 90, through which the upper guide rail 42 and the lower guide rail 52 extend, respectively. The upper guide rail 42 or the lower guide rail 52 in this case extends in the handle bar transverse position substantially through the first transverse bore 82 and in the handle bar parallel position substantially through the second transverse bore 84. The two corner recesses 86, 88 allow the upper guide rail 42 or the lower guide rail 52 to be rotated in the rotation chamber 90 and thus allow the handle bar 68 to be rotated at the guide rails 42, 52.

As shown in FIG. 2, the blinding body 58 is completely folded in the insertion position and thus accommodated compactly inside the cassette 20. In the push-in position, the handle bar 68 takes the handle bar transverse position and rests against a front side 92 of the blinding body 58 facing in the pull-out direction and substantially covers it completely. If required, the blinding body 58, as shown in FIG. 3, can be pulled out horizontally from the cassette 20 by the handle bar 68 and clamped in front of the vehicle front windshield 12. In the clamped shielding position, the handle bars 68 of the two blinding systems 14a, 14b each have the handle bar parallel position so that the magnetic strip 80 of the two handle bars 68 are opposite to each other. The magnetic strips 80 are designed so that they are magnetically attracted to lock the blinding bodies 58 in the blinding position.

The present invention is not limited to embodiments described herein; reference should be had to the appended claims.

LIST OF REFERENCE NUMERALS

10 Blinding arrangement
12 Vehicle front windshield
14 Blinding systems
14a Blinding system
14b Blinding system
16 Guide rail locking device
18 Vehicle dashboard
20 Cassette
22 Cassette holding element
23 Sun visor
24 Cassette pivot joint
25 Inside cassette half
26 Locking projection
27 Rear side (of cassette)
28 Locking receptacle
30 Cassette locking arrangement
31 Locking receptacle holding element
32 Unlocking element
34 Locking sensor
36 Cassette housing
38 Vehicle A-pillar
40 Lower end (of cassette)
42 Upper guide rail
44 Upper guide rail hinge
46 Upper end (of cassette)
48 Cassette cover
52 Lower guide rail
54 Lower guide rail joint
56 Free end (of lower guide rail)
58 Blinding body
60 Upper blinding body guide
63 Guide element
64 Lower blinding body guide
68 Handle bar
70 Front side (of handle bar)
72 Rear side (of handle bar)
74 First lateral side (of handle bar)
76 Second lateral side (of handle bar)
78 Rotation joint
80 Magnetic strip
82 First traverse bore
84 Second traverse bore
86 First corner recess
88 Second corner recess
90 Rotation chamber
92 Front side (of blinding body)
H Height of cassette
L Horizontal guide length
M Vehicle front windshield centerline
Q Horizontal traverse vehicle direction

What is claimed is:

1. A blinding arrangement for shielding a vehicle front windshield, the blinding arrangement comprising:
at least one blinding system comprising,
a cassette which comprises an upper end and a lower end which is arranged opposite to the upper end,
a spannable blinding body which can be moved out of and into the cassette,
a horizontal upper guide rail for guiding the spannable blinding body in a horizontal direction, the horizontal upper guide rail being configured to be fixedly mounted above the vehicle front windshield,
a cassette locking arrangement,
an upper guide rail hinge,
a lower guide rail comprising a free end which is remote from the cassette, the lower guide rail being is configured to guide the spannable blinding body in the horizontal direction,
a lower guide rail hinge, and
a guide rail locking device which is configured to be positioned and fixedly mounted at a lower end region of the vehicle front windshield and via which the lower guide rail is lockable in the lowered use position, wherein,
the cassette is configured to pivot within a cassette pivot plane between a horizontal non-use position in which the cassette is arranged parallel to the horizontal upper guide rail and a lowered use position in which the cassette is arranged perpendicular to the horizontal upper guide rail,
the cassette locking arrangement is configured to lock the cassette in the horizontal non-use position,
the horizontal upper guide rail comprises an end,
the upper end of the cassette is connected to the end of the horizontal upper guide rail via the upper guide rail hinge,
one end of the lower guide rail is connected to the lower end of the cassette via the lower guide rail hinge,
the lower guide rail is arranged parallel to the cassette in the horizontal non-use position and is arranged perpendicular to the cassette in the lowered use position, and
in the lowered use position, the free end of the lower guide rail is fixed to the guide rail locking device.

2. A blinding arrangement for shielding a vehicle front windshield, the blinding arrangement comprising:
at least one blinding system comprising,
a cassette which comprises an upper end and a lower end which is arranged opposite to the upper end,
a spannable blinding body which can be moved out of and into the cassette,
a horizontal upper guide rail for guiding the spannable blinding body in a horizontal direction, the horizontal upper guide rail being configured to be fixedly mounted above the vehicle front windshield,
a cassette locking arrangement,
an upper guide rail hinge,
a lower guide rail which is configured to guide the spannable blinding body in the horizontal direction,
a lower guide rail hinge, and
a handle bar which is substantially plate-shaped via which the spannable blinding body is movable out of the cassette and into the cassette, the handle bar being rotatable between a handle bar transverse position, in which the handle bar is aligned transversely to a direction of movement of the spannable blinding body, and a handle bar parallel position, in which the handle bar is aligned parallel to the direction of movement of the spannable blinding body, wherein,
the cassette is configured to pivot within a cassette pivot plane between a horizontal non-use position in which the cassette is arranged parallel to the horizontal upper guide rail and a lowered use position in which the cassette is arranged perpendicular to the horizontal upper guide rail,
the cassette locking arrangement is configured to lock the cassette in the horizontal non-use position,
the horizontal upper guide rail comprises an end,
the upper end of the cassette is connected to the end of the horizontal upper guide rail via the upper guide rail hinge,
one end of the lower guide rail is connected to the lower end of the cassette via the lower guide rail hinge,
the lower guide rail is arranged parallel to the cassette in the horizontal non-use position and is arranged perpendicular to the cassette in the lowered use position, and
the handle bar comprises a rotation joint at at least one longitudinal end thereof, the rotation joint being configured to be guided on the horizontal upper guide rail or on the lower guide rail, the rotation joint comprising,
a first transverse bore which extends from a front side of the handle bar which faces away from the cassette in a handle bar transverse position to an opposite rear side of the handle bar,
a second transverse bore which extends perpendicular to the first transverse bore from a first lateral handle bar side which is remote from the cassette in the handle bar parallel position to an opposite second lateral handle bar side,
wherein,
the first traverse bore and the second traverse bore cross each other and are connected to each other via two diagonally opposite corner recesses so that the horizontal upper guide rail is rotatable between the first transverse bore and the second transverse bore.

\* \* \* \* \*